(12) United States Patent
Räftegård (10) Patent No.: US 12,467,148 B2
(45) Date of Patent: Nov. 11, 2025

(54) IMPRESSED CURRENT CATHODIC PROTECTION SYSTEM AND A METHOD OF OPERATING THE SYSTEM

(71) Applicant: VOLVO PENTA CORPORATION, Gothenburg (SE)

(72) Inventor: Viktor Räftegård, Floda (SE)

(73) Assignee: VOLVO PENTA CORPORATION, Gothenburg (SE)

( * ) Notice: Subject to any disclaimer, the term of this patent is extended or adjusted under 35 U.S.C. 154(b) by 550 days.

(21) Appl. No.: 18/060,824

(22) Filed: Dec. 1, 2022

(65) Prior Publication Data

US 2023/0096293 A1 Mar. 30, 2023

(30) Foreign Application Priority Data

Dec. 2, 2021 (EP) ..................................... 21211991

(51) Int. Cl.
*C23F 13/04* (2006.01)
*B63B 59/04* (2006.01)
*C23F 13/22* (2006.01)

(52) U.S. Cl.
CPC .............. *C23F 13/04* (2013.01); *B63B 59/04* (2013.01); *C23F 13/22* (2013.01)

(58) Field of Classification Search
CPC ...................................................... B63B 59/04
See application file for complete search history.

(56) References Cited

U.S. PATENT DOCUMENTS

| 2,903,405 | A | 9/1959 | Sabins | |
|---|---|---|---|---|
| 5,627,414 | A | 5/1997 | Brown et al. | |
| 8,118,983 | B1 * | 2/2012 | Anderson | C23F 13/04 204/196.04 |
| 8,317,996 | B2 * | 11/2012 | Nelvig | C23F 13/04 204/196.04 |

FOREIGN PATENT DOCUMENTS

| WO | 2009157815 A1 | 12/2009 |
|---|---|---|
| WO | 2021063507 A1 | 4/2021 |

OTHER PUBLICATIONS

Extended European Search Report in corresponding European Application No. 21211991.1 dated Jun. 3, 2022 (9 pages).

\* cited by examiner

*Primary Examiner* — Alexander W Keeling
(74) *Attorney, Agent, or Firm* — Venable LLP; Jeffri A. Kaminski (57) ABSTRACT

A marine ICCP system includes an electrical circuit comprising a primary and a secondary circuit. The primary circuit comprises a first electrode connected to a positive terminal of a power source to act as an active anode; and a second electrode connected to a negative terminal of the power source. The secondary circuit comprises a passive electrode normally disconnected from the electrical circuit and arranged to act as back-up protection, wherein the second electrode connectable to the passive electrode. The passive electrode is arranged to be connected to the power source if a detected output voltage in the primary circuit reaches a maximum value and if a determined polarization potential for the cathode is insufficient. The control unit is operable to control the output voltage supplied to the primary and secondary circuits separately in order to supply an individual output voltage to each circuit.

12 Claims, 5 Drawing Sheets

IMPRESSED CURRENT CATHODIC PROTECTION SYSTEM AND A METHOD OF OPERATING THE SYSTEM

TECHNICAL FIELD

The present invention relates to impressed current cathodic protection for marine vessels, wherein an on-board impressed current cathodic protection system is used for protecting metallic components against corrosion. The invention also relates to a marine vessel with such an arrangement, and also to a method for operating such an arrangement.

BACKGROUND

Seawater is a corrosive environment and the parts used for marine propulsion units and other immersed metallic parts require some form of cathodic protection in order to eliminate or reduce corrosion of those parts. An efficient way of providing corrosion protection is the use of a method termed impressed current cathodic protection (ICCP). ICCP systems are often used on cargo carrying ships, tankers and larger pleasure craft. KR101066104B1 discloses the general principle for an ICCP system wherein a metal element and an anode are attached to a vessel and immersed in water. The metal element is connected to the negative terminal and the anode is connected to the positive terminal of a source DC electrical power to provide an electric de-passivation current through an electrical circuit including the anode, the metal element and the electrolyte. In this way, the anode provides corrosion protection for the metal parts. By maintaining a predetermined polarization potential of the protected metal parts, the ICCP system can provide a desired protection level for the metal parts to be protected.

Marine vessels moving in waterways such as river estuaries will be exposed to seawater, fresh water and brackish water comprising a mixture of these. With reduced salinity the resistivity of the water in which the vessel is immersed increases. At some point the electrical resistance in the electrical circuit of the corrosion protection system may increase to a level where the ICCP is unable to maintain the potential of the protected structure within an acceptable interval. Conventional ICCP system may interpret the increased potential and the corresponding low protection level as an internal error or a malfunction caused by external factors. When this occurs, a conventional ICCP system may shut down and switch to passive back-up galvanic anodes for protection. In fresh or brackish water galvanic anodes will provide little or no corrosion protection.

In addition, there are conditions that lead to an increased CP current demand in order to maintain the potential of the protected structure and that at some point may result in underprotection. Such conditions can occur while the vessel is moving through the water and some time afterwards or when it is subjected to water currents, tidal movement or wave surges causing a flow of water relative to the hull. Also, stray currents may increase the current required to maintain protection potential.

The invention provides an improved impressed current corrosion protection system aiming to solve the above-mentioned problems.

SUMMARY

An object of the invention is to provide a method and an impressed current corrosion protection system which solves the above-mentioned problems.

The object is achieved by an impressed current corrosion protection system and a method for operating the system according to the appended claims.

In the subsequent text, the cathodic protection system used by the invention is described for application to a marine propulsion system in the form of a stern drive mounted to a transom on the vessel. However, the inventive arrangement is also applicable to, for instance, azimuthing or pod drives and outboard drives. The cathodic protection system according to the invention involves an impressed current cathodic protection (ICCP) system which is operated using direct current (DC), wherein elements to be protected are connected to a negative terminal and an anode is connected to a positive terminal of a source DC electrical power. In the subsequent text, the power source used for supplying DC power to the system is not necessarily a battery, but the power source can be any suitable source of electrical power such as a fuel cell or a source of alternating current (AC) provided with an AC/DC rectifier.

In addition to drive units, the cathodic protection system can also be used for protecting other metallic or partially metallic components, such as through-hull fittings, trim tabs, various openings/bushings in the hull and an at least partially metallic hull.

The invention is applicable to a marine vessel with a marine propulsion system provided with a cathodic protection system in the form of an ICCP system. The marine propulsion system comprises at least one driveline housing at least partially submerged in an electrolyte in the form of a body of water, a torque transmitting drive shaft extending out of each driveline housing and at least one propeller mounted on the drive shaft. If a propeller is used as an anode, then the at least one propeller is electrically isolated from its drive shaft and each electrically isolated propeller is connected to a positive terminal of a direct current power source. The vessel can comprise one or more driveline housings comprising a single drive shaft with a single propeller or counter-rotating propellers with coaxial drive shafts. The system provides cathodic protection, wherein each metallic component to be protected against corrosion is connected to a negative terminal of the direct current power source. A control unit is arranged to regulate the voltage and/or the current output from the direct current power source.

The cathodic protection system is an impressed current cathodic protection (ICCP) system comprising at least one hull or drive mounted anode or where at least one propeller can be used as an anode. The at least one metallic component to be protected forms a cathode and can be the at least one driveline housing, at least one trim tab, seawater intake, swimming platform and/or at least a portion of the vessel hull. Note that this is a non-exclusive list of metallic components suitable for corrosion protection.

In the example where at least one propeller is used as an anode, the at least one propeller is electrically isolated from its drive shaft by a torque transmitting electrically isolating component mounted between the at least one propeller and its respective drive shaft. The electrically isolating component is mounted in a gap formed by the outer surface of the drive shaft and the inner surface of the propeller hub. The torque transmitting electrically isolating component can be made from an elastic material, such as a natural or synthetic rubber. The at least one propeller is made from an inert anode material, such as titanium, niobium or a similar suitable metal or metal alloy.

Alternatively, one or more inert anodes can be attached to suitable parts of the hull of the vessel components to be protected. In this example, an inert anode can be electrically insulated from and mounted on the driveline housing or the transom and be connected to a positive terminal of a direct current power source via electrical wiring. The propellers could in this case be part of the protected metallic components and would not require electrical insulation from their drive shafts.

According to one aspect of the invention, a marine impressed current cathodic protection system has an electrical circuit comprising a control unit for controlling the impressed current cathodic protection system, voltage sensors detecting an output voltage impressed on the circuit and measuring polarization potential of the protected parts, current sensors detecting a current supplied to different parts of the circuit and a source of electrical power from at least one direct current power source.

The electrical circuit comprises a primary circuit comprising at least one first electrode connected to a positive terminal of the at least one power source to act as an active anode, at least one second electrode connected to a negative terminal of the at least one power source to act as a cathode. The current and voltage in the primary circuit is controlled by the control unit to maintain a predetermined polarization potential for the cathode. The polarization potential for the cathode can have a desired value for optimal protection but can be allowed to vary within a set potential range that still provides an acceptable level of protection.

During normal ICCP operation, the control unit is arranged to control the primary circuit of the ICCP system as described in the text above, wherein an anode such as a hull mounted anode or an electrically isolated propeller anode is connected to a positive terminal of a direct current power source and cathodes to be protected are connected to a negative terminal of a direct current power source.

The electrical circuit further comprises a secondary circuit comprising at least one passive electrode normally disconnected from the electrical circuit when the ICCP system is in operation. The at least one passive electrode is a sacrificial anode arranged to act as back-up protection. Back-up protection from the at least one passive electrode can be provided if, for instance, a fault occurs in the primary circuit requiring the DC power source to be disconnected from the primary circuit. The at least one second electrode is then connectable to the at least one passive electrode to form a part of the secondary circuit. The secondary circuit is controlled by the above-mentioned control unit.

Under certain operating conditions the at least one passive electrode is connectable to the at least one second electrode and to the positive terminal of the at least one power source by a controllable switch in the secondary circuit. The secondary circuit is then connected to the cathode in the same way as, but separate from, the primary circuit. In order to detect such operating conditions, the control unit is operable to monitor the output voltage and current supplied to the at least one first electrode, and to determine a value for polarization potential for the at least one cathode in the primary circuit. The control unit is further operable to compare the polarization potential of the cathode to a desired protection potential and to control the output voltage and current to minimize the potential difference. The output voltage supplied to the primary circuit is limited by a maximum value for the output voltage in the primary circuit. As the at least one source of power connected to the first circuit is likely to supply DC power in the range of 12-48 Volts, the maximum value for the output voltage in the primary circuit will as a rule correspond to the breakdown potential of the first electrode. The breakdown potential is determined by the material used in the first electrode. According to one example, a first electrode made from titanium will have a breakdown potential of 8 Volts. If the output voltage is allowed to exceed the breakdown potential of the first electrode, then this will cause damage to the first electrode. This is undesirable due to the cost of replacing this type of inert anodes.

According to one example, if a detected output voltage in the primary circuit reaches a maximum value and if a determined polarization potential for the at least one second electrode, or cathode, is insufficient, then the control unit can initially connect the at least one second electrode to the at least one passive electrode, or sacrificial anode. If a subsequently determined polarization potential for the at least one second electrode is still insufficient, then the control unit is operable to connect the at least one passive electrode to the positive terminal of the at least one power source in order to boost the polarization potential for the at least one second electrode.

According to a further example, the control unit is operable to connect the at least one passive electrode to the at least one second electrode and the at least one power source immediately. This action can be performed if a detected output voltage in the primary circuit reaches a maximum value and the control unit has determined that the resistivity of the surrounding body of water is above a threshold value, indicating that the vessel is located in fresh or brackish water. In this case the initial connection of the at least one second electrode to the at least one passive electrode, as the added polarization potential provided by the at least one passive electrode will not be sufficient to provide an acceptable level of protection.

The control unit is operable to control the output voltage supplied to the primary and secondary circuits separately; in order to supply an individual output voltage to each circuit. As opposed to the output voltage for the primary circuit, the output voltage supplied to the secondary circuit is theoretically only limited by the voltage of the at least one direct current power source. However, for reasons of safety, the maximum output voltage for the secondary circuit will be restricted in practice. The control unit can be operable to supply both circuits from a single power source or to supply the respective circuits from different power sources having the same or different output power. For instance, the primary circuit can be supplied from a 12-, 24- or 48-Volt battery or a suitable generator, while the secondary circuit can be supplied from a high voltage energy storage unit that can provide several hundred Volts. The output voltage in the primary and secondary circuits can be controlled individually to provide a polarization potential for the at least one second electrode that provides at least an acceptable level of protection.

The above-mentioned ICCP system can also be used for measuring the salinity of the surrounding body of water, or electrolyte. In order to measure salinity, the control unit is arranged to interrupt the impressed cathodic protection operation and to initiate a measurement sequence at predetermined intervals. A suitable time interval can be selected from a few minutes up to 15 minutes or more, although every 5 or 10 minutes is sufficient for the purpose of the invention. The interval can be selected depending on the use of the vessel and the likelihood of the vessel encountering freshwater conditions. For instance, the time interval can be set to a default value of 10 minutes during operation in sea water. If the calculated resistivity shows a deviation from an expected value or range of values after a measurement sequence, then the time interval can be set to a shorter value, such as 5 minutes, until the resistivity values return to normal values for sea water. This arrangement is described in the application PCT/EP2019/076790. However, the salinity measurement mode as such is not part of the current invention and will not be described in further detail here.

The above-mentioned measurement of resistivity can be used by the control unit for determining if an operating condition exists requiring connection of the at least one passive electrode to the at least one second electrode and to the positive terminal of the at least one power source. If an increase in resistivity is detected at the same time as it is detected that the polarization potential of the at least one cathode is more electropositive than a predetermined value, then the secondary circuit can be controlled to assist the primary circuit in providing a sufficiently electronegative polarization potential for the at least one cathode.

According to a second aspect of the invention, marine vessel is protected by an impressed current cathodic protection system controlled by a device as described above.

According to a third aspect of the invention, a method for controlling a marine impressed current cathodic protection system having an electrical circuit comprising a control unit for controlling the impressed current cathodic protection system, voltage sensors detecting an output voltage impressed on the circuit and measuring polarization potential of the protected parts, current sensors detecting a current supplied to the circuit and at least one source of electrical power from at least one direct current power source. The electrical circuit comprises a primary circuit comprising at least one first electrode connected to a positive terminal of the power source to act as an active anode and at least one second electrode connected to a negative terminal of the power source to act as a cathode. The electrical circuit further comprises a secondary circuit comprising at least one passive electrode normally disconnected from the electrical circuit when the ICCP system is in operation. The at least one passive electrode is a sacrificial anode arranged to act as back-up protection. Back-up protection from the at least one passive electrode can be provided if, for instance, a fault occurs in the primary circuit requiring the DC power source to be disconnected from the primary circuit. The at least one second electrode is then connectable to the at least one passive electrode to form a part of the secondary circuit. The secondary circuit is controlled by the above-mentioned control unit.

The method comprises the steps of:
monitoring the output voltage and current supplied to the at least one first electrode and determining a value for polarization potential for the primary circuit;
comparing the polarization potential to a desired protection potential and controlling the output voltage and current to minimize the potential difference;
and if the monitored output voltage reaches a maximum value and if a determined polarization potential for the cathode is insufficient, the method performs the steps of
connecting the at least one passive electrode to a source of electrical power; and
controlling the output voltage supplied to the primary and secondary circuits separately and supplying an individual output voltage to each circuit.

The output voltage supplied to the primary circuit is limited by the maximum value for the output voltage in the primary circuit. However, as the at least one source of power connected to the first circuit is likely to supply electrical power in the range 12 to 48 Volts, the maximum value for the output voltage in the primary circuit will as a rule correspond to the breakdown potential of the first electrode. The output voltage supplied to the secondary circuit is limited by the voltage of the at least one direct current power source, as described above.

The arrangement according to the invention solves at least in part the problem of maintain the function of a corrosion protection system, such as an ICCP system, when a vessel is operated in stretches of water where the salinity can change, such as river estuaries or when in conditions requiring higher CP current than during steady-state conditions. With reduced salinity, the resistivity of the water increases and at some point the electrical resistance will be too high for the ICCP system to be able to maintain the potential of the protected structure within an acceptable interval. Also, an increased current demand to maintain CP at a certain potential may lead to a situation when the system reaches the maximum voltage and beyond that the protection potential will change in the positive direction. Current ICCP systems do not understand whether the reason for the low protection is an internal error or if it is due to external factors, such as increased salinity or the effect of flowing water past the hull and the protected components. As a consequence, it will shut down the ICCP system and switch to a back-up galvanic anode for protection, which results in a reduced protection status. The system is able to measure the polarization potential and/or salinity and can determine that the limited capacity of the ICCP system is due to increased water resistivity. Instead of automatically shutting itself down, the ICCP system can continue to provide as good a protection as possible when the vessel moves into less saline water. A further advantage is that the invention can determine the resistivity of the water using on-board equipment, eliminating the need for a separate device for this purpose. Further, the inventive arrangement can transmit a signal to a user indicating that the target potential is not reached, but also inform the user that the reason is a change in resistivity and salinity and not an internal malfunction. The user can therefore be prevented from manually switching to the back-up galvanic anode for protection.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
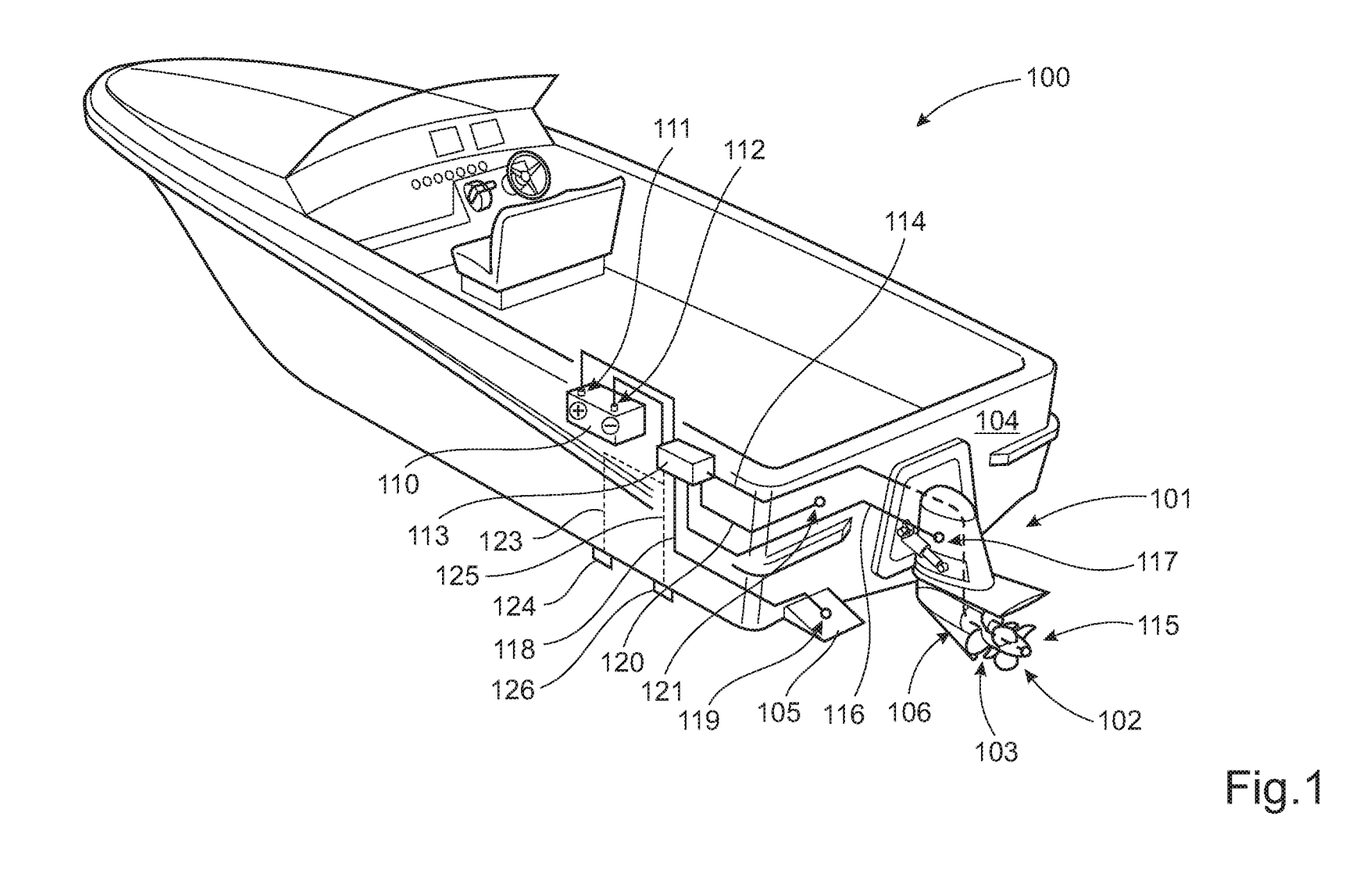
FIG. 1 shows a schematically illustrated vessel comprising a marine anti-fouling arrangement/corrosion protection system according to the invention.
Figure 2:
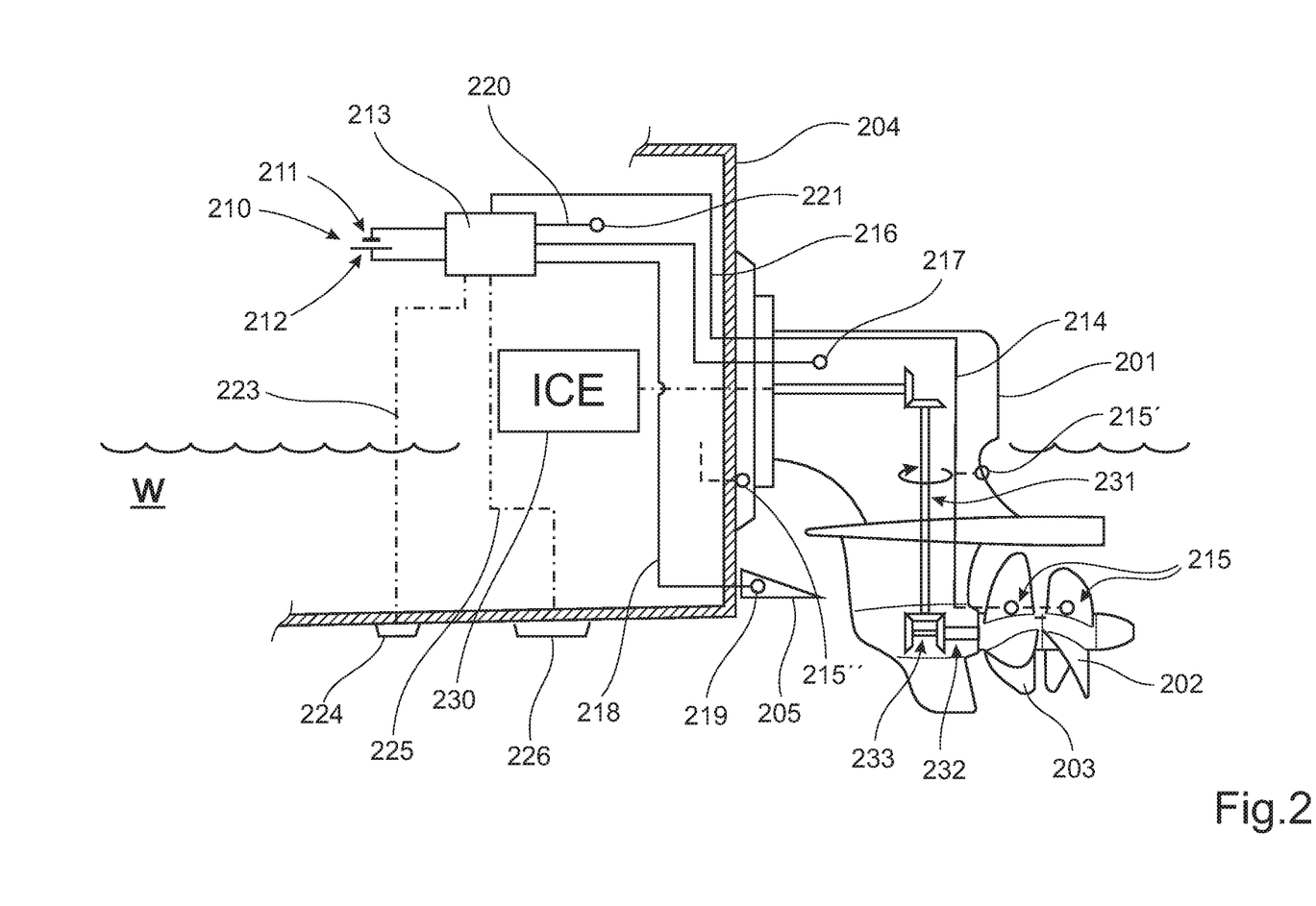
FIG. 2 shows a schematic a cross-section of the rear portion of the marine vessel.

FIG. 1 shows a schematically illustrated marine vessel 100 comprising a corrosion protecting arrangement. The vessel comprises a hull with a transom 104 to which a marine propulsion system is attached. The propulsion system in this example comprises a single driveline housing 101 at least partially submerged in water, a torque transmitting drive shaft 106 (not shown) extending out of the driveline housing 101, and a pair of counter-rotating propellers 102, 103 mounted on the drive shaft 106. In the current example, both propellers 102, 103 are electrically isolated from its drive shaft 106. The drive shaft arrangement is shown in FIG. 2 and will be described in further detail below. Further, each metallic component 101, 104, 105 to be protected against corrosion is connected to a negative terminal 112 of the direct current power source 110, in order to form cathodes. A control unit 113 is connected to the direct current power source 110 and distributes current to all component parts forming an electrical circuit. The control unit 113 is arranged to regulate the voltage and current output from the direct current power source 110. In order to assist regulation of the voltage and current output a reference electrode 124 is mounted in a suitable position and connected to the control unit 113 via an electrical wire 123. The reference electrode 124 measures a voltage difference between itself and the metallic components, which is directly related to the amount of protection received by the anode.

The control unit 113 compares the potential difference measured relative by the reference electrode 124 with a pre-set internal potential. The output voltage is then automatically adjusted to maintain the electrode potential equal to the pre-set potential. The control unit 113 can also perform a voltage interruption sequence to determine a polarization potential for the protected metallic components 101, 104, 105.

During normal operation of an ICCP system, regulation of the voltage and current output from the direct current power source is controlled to automate the current output while the voltage output is varied, or to automate the voltage output while the current output is varied. This allows the corrosion protection level to be maintained under changing conditions, e.g. variations in water resistivity or water velocity. In a sacrificial anode system, increases in the seawater resistivity can cause a decrease in the anode output and a decrease in the amount of protection provided, while a change from stagnant conditions results in an increase in current demand to maintain the required protection level. With ICCP systems protection does not decrease in the range of standard seawater nor does it change due to moderate variations in current demand. An advantage of ICCP systems is that they can provide constant monitoring of the electrical potential at the water/protected structure interface and can adjust the output to the anodes in relation to this. An ICCP system comprising a reference electrode is more effective and reliable than sacrificial anode systems where the level of protection is unknown and uncontrollable.

The corrosion protection arrangement in FIG. 1 is an impressed current cathodic protection (ICCP) system which in this example uses the counter-rotating propellers 102, 103 as an active anode 115. In FIG. 1, the metallic components to be protected against corrosion is the driveline housing 101, the trim tabs 105 (one shown), and a metal portion of the hull, in this case the transom 104. Note that this is a non-exclusive list of metallic components suitable for corrosion protection. In order to achieve this, the positive terminal 111 and the negative terminal 112 of the battery 110 are connected to the control unit 113. The control unit 113 is arranged to connect the positive terminal 111 to the propellers 102, 103 via a first electrical wire 114. The control unit 113 is further arranged to connect the negative terminal 112 to an electrical connector 117 on the driveline housing 101 via a second electrical wire 116. The negative terminal 112 is also connected to an electrical connector 119 on the trim tab 105 via a third electrical wire 118 and is also connected to an electrical connector 121 on the transom 104 via a fourth electrical wire 120.

The corrosion protection system is further provided with a passive, sacrificial anode 126 that can provide protection if a fault occurs in the active ICCP system (e.g. an electrical fault or a drop in battery voltage), or if the user selects chlorine gas-free operation. The sacrificial anode 126 can be located at any suitable location on the vessel and is connectable to the control unit 113 via a fifth electrical wire 125. The control unit 113 is arranged to disconnect the active anode 115 from the battery 110 and to connect the sacrificial anode 126 to the metallic component to be protected when such a fault occurs.

Under certain operating conditions the sacrificial anode 126 is connectable to the metallic components 101, 104, 105 to be protected against corrosion and to the positive terminal of the battery 110 by a controllable switch (see FIG. 3A) in the secondary circuit. In order to detect such operating conditions, the control unit 113 is operable to monitor the output voltage and current supplied to the active anode 115 (the propellers 102, 103), and to determine a value for polarization potential for the cathode (metallic components) 101, 104, 105 in the primary circuit. The control unit 113 is further operable to compare the polarization potential of the cathode 101, 104, 105 to a desired protection potential and to control the output voltage and current to minimize the potential difference.

If a detected output voltage for the active anode 115 reaches a maximum value and if a determined polarization potential for the cathode, i.e. the metallic components 101, 104, 105, is insufficient, then the control unit 113 can initially connect the cathode 101, 104, 105 directly to the sacrificial anode 126. If a subsequently determined polarization potential for the cathode 101, 104, 105 is still insufficient, then the control unit 113 is operable to connect the sacrificial anode 126 to the cathode via the battery 110 in order to boost the polarization potential for the cathode 101, 104, 105.

FIG. 2 shows a cross-section of the rear portion of the marine vessel 100 of FIG. 1, through a transom 204 and a driveline housing 201. The single driveline housing 201 is partially submerged in water and comprises torque transmitting drive shafts 232, 233 extending out of the driveline housing 201. A pair of counter-rotating propellers 202, 203 is mounted on their respective drive shafts 233, 232. In this example, the drive shafts 232, 233 are driven by an internal combustion engine ICE via a transmission 231. Transmissions for driving counter-rotating propellers are well known in the art and will not be described in detail here. Alternative drive units for driving the propellers are possible within the scope of the invention. For instance, drive units comprising one or more pushing or pulling propellers can be used within the scope of the invention. Although the described examples relate to drive units mounted on a transom, the invention can be applied to most drive installations, such as outboard/inboard installations, Z-drives and azimuthing pod installations. The invention is not dependent on the type of power source provided, but can be applied to marine vessels using ICE, hybrid or electric power sources for propulsion or power generation.

In the example shown in FIGS. 1 and 2, the at least one propeller is used as an anode, wherein the at least one propeller is electrically isolated from its respective drive shaft. This is not a requirement for alternative examples where the at least one propeller is not used as an anode. In the current example, both propellers 202, 203 are electrically isolated from its respective drive shaft 232, 233. The propellers are electrically isolated from their respective drive shafts by a torque transmitting electrically isolating component mounted between a propeller and its respective drive shaft. The electrically isolating component is mounted in a gap formed by the outer surface of the drive shaft and the inner surface of the propeller hub. The torque transmitting electrically isolating component can be made from an elastic material, such as a natural or synthetic rubber. The propellers are made from an inert anode material, such as titanium, niobium or a similar suitable metal or metal alloy. A dielectric shield can be provided on the drive shaft between each propeller hub and the drive shaft on which the propeller is mounted. A non-exclusive list of suitable materials for use in such a dielectric shield includes polymer or polymer-ceramic materials with suitable dielectric properties.

As schematically indicated in FIG. 2, each electrically isolated propeller 202, 203 is connected to a positive terminal 211 of a direct current power source 210 at schematically indicated points 215 via electrical wiring 214. The electrical connection of the propellers will be described in further detail below. This allows the propellers to act as active anodes.

Alternatively, one or more inert anodes 215', 215" can be electrically insulated from and mounted on the driveline housing 201 or the transom 204, respectively, and be connected to the positive terminal 211 of the direct current power source 210 via electrical wiring (not shown) similar to the wiring used for the propellers in the above example. The propellers 202, 203 would in this case be part of the protected metallic components and would not necessarily require electrical insulation from their drive shafts.

Further, each cathode, or metallic component 201, 204, 205 to be protected against fouling is connected to a negative terminal 212 of the direct current power source 210. A control unit 213 is arranged to regulate the voltage and current output from the direct current power source 210. As described above, the positive terminal 211 and the negative terminal 212 of the battery 210 are connected to the control unit 213. The control unit 213 is arranged to connect the positive terminal 211 to the propellers 202, 203 via a first electrical wire 214. The control unit 213 is further arranged to connect the negative terminal 212 to an electrical connector 217 on the driveline housing 201 via a second electrical wire 216. The negative terminal 212 is also connected to an electrical connector 219 on the trim tab 205 (one shown) via a third electrical wire 218 and connected to an electrical connector 221 on the transom 204 via a fourth electrical wire 220. A reference electrode 224 is mounted on the hull remote from the propellers 202, 203 forming an anode and connected to the control unit 213 via an electrical wire 223. Regulation of the voltage and current output from the direct current power source using the control unit 213 has been described above. The ICCP system is further provided with a passive, sacrificial anode 226 that can provide protection if a fault occurs in the active ICCP system, or if the user selects chlorine gas-free operation. Alternatively, the passive, sacrificial anode 226 can provide protection in combination with the ICCP system, wherein the sacrificial anode 226 can be connected to the positive terminal of the direct current power source 210 or to a separate direct current power source (not shown; se FIGS. 3A-3B). This combined operation will be described in further detail below. The sacrificial anode 226 can be located at any suitable location on the vessel and is connectable to the control unit 213 via a fifth electrical wire 225. The corrosion protection systems described in FIGS. 1 and 2 can also be used for electrolyte resistivity and salinity measurement, as will be described below.

Figure 3A:
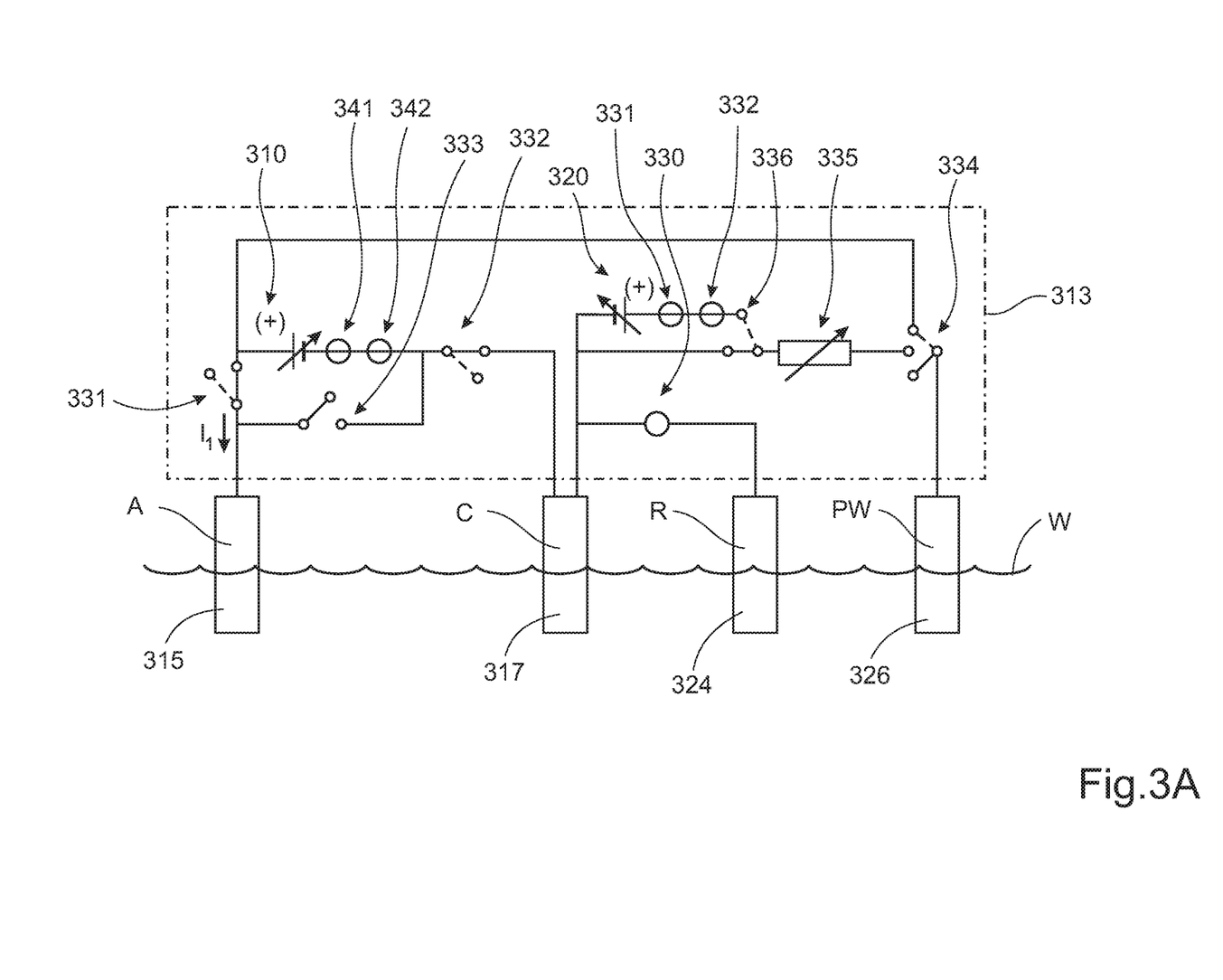
FIG. 3A shows a schematic first representation of an electrical circuit for the corrosion protection system of the vessel in FIG. 2.

FIG. 3A shows a schematic first representation of an electrical circuit for the corrosion protection system of the vessel in FIGS. 1 and 2 in its normal, active operating mode. The electrical circuit comprises a primary circuit where a first battery 310 is connected to an active anode 315 (A) and at least one cathode 317 (C) to be protected. This connection is provided via a control unit 313, which is adapted to vary and control the electrical power to the active anode 315 and the cathode 317, as indicated with an arrow adjacent the first battery 310.

The control unit 313 is adapted to measure an electrical potential of the cathode 317 with a reference electrode 324 (R) as a ground reference. The electrical potential of the cathode 317 is measured using a voltage sensor 330. The electrical potential is indicative of the surface polarization at the interface between the cathode 317 and an electrolyte W; in this case water. The control unit 313 is further adapted to control the electrical power to the active anode 315 (A) and the cathode 317 (C) based at least partly on the measured electrical potential of the cathode 317 with the reference electrode 324 (R) as a ground reference. Through the control of the electrical power, a first electrical current (indicated in FIG. 3A with an arrow $I_1$), through an electrical circuit comprising the active anode 315, the cathode 317 and the electrolyte W, is controlled.

More specifically, the parameter of interest for control of the corrosion protection of the cathode 317 is the electrical potential of the cathode 317 with the reference electrode as a ground reference, corresponding to the surface polarization at the interface between the cathode 317 and the water W, and the electrical power to the active anode 315 and the cathode 317 is subjected to a closed loop control so as for said surface polarization to assume a desired value.

Thus, the ICCP system for the cathode 317 comprises a primary circuit including the cathode 317, the active anode 315, the reference electrode 324, the first battery 310 and the control unit 313. In FIG. 3A the schematic electrical circuit of the corrosion protection system is only shown to comprise a single cathode, in this case the drive 317. However, additional components to be protected, such as the trim tabs, the transom and other exposed metallic components (see FIG. 2) can be connected to the control unit 313 as cathodes in the same way as the drive 317.

The control unit 313 further comprises a number of controllable switches for controlling different functions of the corrosion protection system. A first switch 331 is arranged between the positive terminal of the first battery 310 and the anode 315, which first switch 331 is normally closed to supply the anode with power during an active corrosion protection mode. When opened, the first switch 331 disconnects the active anode 315 from the positive terminal of the first battery 310. A second switch 332 is arranged between the negative terminal of the first battery 310 and the cathode 317, which second switch 332 is normally switched to a closed position to maintain a closed circuit including the active anode 315, the cathode 317 and the first battery 310 during active corrosion protection mode, wherein a current $I_1$ flows from the first battery 310 to the active anode 315. The output voltage from the first battery 310 is measured by a voltage sensor 341 and the current is measured by a current sensor 342. When opened, the second switch 332 can disconnect the cathode 317 from the negative terminal of the first battery 310. A third switch 333 is arranged between the negative terminal of the first battery 310 and the anode 315, which third switch 333 is normally open during active corrosion protection mode. When closed, the third switch 333 can connect the active anode 317 to the negative terminal of the first battery 310, which is a setting used for salinity measurement. A fourth switch 334 is arranged to connect or disconnect a sacrificial, or passive anode 326 (P) to or from the corrosion protection system. The fourth switch 334 is a three-position switch that is normally in a first position (lower contactor in FIG. 3A) during active corrosion protection mode, wherein the passive anode 326 is completely disconnected from the system. In a second position (upper contactor in FIG. 3A), the passive anode 326 is connectable to the positive terminal of the first battery 310, during a salinity measurement mode which will be described below. In a third position (central contactor in FIG. 3A), the passive anode 326 is connectable to the cathode 317 to provide passive or active corrosion protection, as will be described in further detail below.

The corrosion protection system for the cathode 317 comprises a passive corrosion protection system with the passive anode 326 and the control unit 313. If the user selects chlorine gas-free operation, or if a fault occurs in the primary circuit of the active corrosion protection system, then the fourth switch 334 is switched from its open position to the closed third position (central contactor in FIG. 3A) to connect the passive anode 326 to the cathode 317. Prior to this action, or at least at the same time, the first switch 331 is controlled to its open position to disconnect the active anode 315 and the first battery 310 from the cathode 317. This electrical circuit provides a passive back-up corrosion protection system for the vessel. As indicated above, the control unit 313 is adapted to measure electrical potential of the cathode 317 with the reference electrode 324 as a ground reference. The electrical potential is indicative of the surface polarization at the interface between the cathode 317 and the water W. The control unit 313 is further adapted to control an adjustable resistance 335 in the electrical connection between the passive anode 326 and the cathode 317 based at least partly on the measured second electrical potential of the cathode 317 with the reference electrode 324 as a ground reference. Through control of the adjustable resistance 335 an electrical current between the passive anode 326 and the cathode 317, herein also referred to as a second electrical current (indicated in FIG. 3A with an arrow $I_2$), is controlled. Thus, the second electrical current I2 runs through an electrical circuit comprising the passive anode 326, the cathode 317 and the electrolyte W during passive corrosion protection mode.

The electrical circuit further comprises a secondary circuit including the cathode 317, the passive anode 326, the reference electrode 324, the control unit 313 and/or the first battery 310. The control unit 313 further comprises a controllable fifth switch 336 for controlling different functions in the secondary circuit. A first function has been described above, wherein the corrosion protection system is operated as a passive corrosion protection system. In this case the fourth switch 334 is switched from its open position to the closed third position and the fifth switch 336 is switched to a first position to connect the passive anode 326 directly to the cathode 317. The secondary circuit is connected in parallel to the primary circuit. A second function will be described in connection with FIG. 3B below.

Figure 3B:
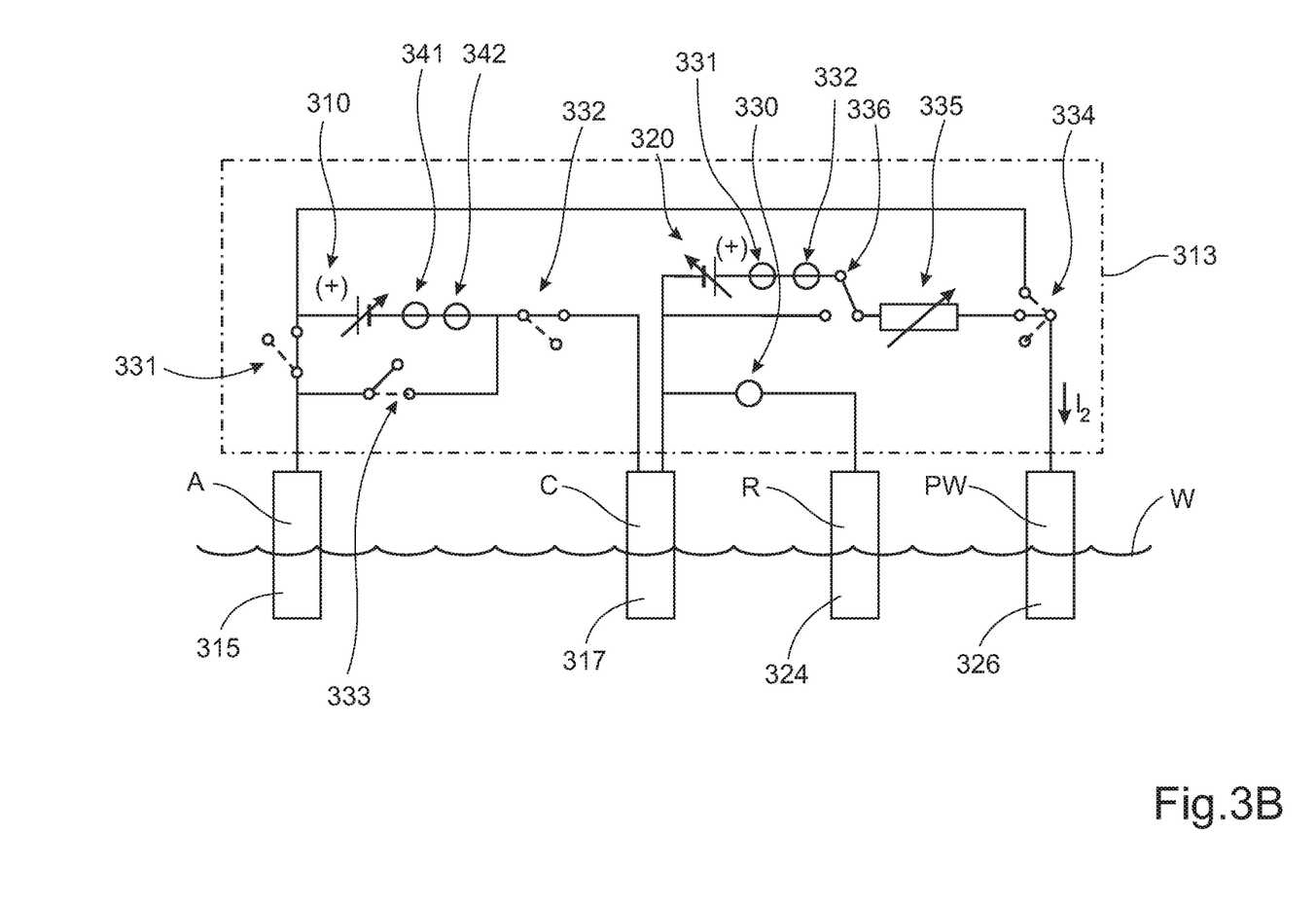
FIG. 3B shows schematic second representation of an electrical circuit in FIG. 3A.

FIG. 3B shows a schematic second representation of the corrosion protection system of the vessel in FIGS. 1 and 2 in an alternative corrosion protection mode. The electrical circuit indicated in FIG. 3B has been described in connection with FIG. 3A above. In its normal, active operating mode the corrosion protection system comprises said primary circuit including the cathode 317 (C), the active anode 315 (A), the reference electrode 324 (R), the first battery 310 and the control unit 313.

Under certain operating conditions neither the active anode 315 in the primary circuit nor the combined primary circuit and the passive anode 326 in the secondary circuit will be able to provide sufficient protection for the cathode 317. Under such operating conditions the passive anode 326 is connectable to the cathode 317 to be protected against corrosion via the positive terminal of a second battery 320 by the controllable fifth switch 336 in the secondary circuit. The second battery 320 can be a separate battery, or the same battery 310 as used in the primary circuit. In order to detect such operating conditions, the control unit 313 is operable to monitor the output voltage and current supplied to the active anode 315 by the first battery 310 using a voltage sensor 341 and a current sensor 342. The control unit 313 is arranged to determine a value for polarization potential for the cathode 317 in the primary circuit. The control unit 113 is further operable to compare the polarization potential of the cathode 317 to a desired protection potential and to control the output voltage and current from the first battery 310 to minimize the potential difference.

The output voltage supplied to the primary circuit is limited by a maximum value for the output voltage of the first battery 310 in the primary circuit. However, as the battery connected to the first circuit is typically arranged to supply electrical power in the range 12 to 48 Volts, the maximum value for the output voltage in the primary circuit will as a rule be restricted to the breakdown potential of the active anode. The breakdown potential is determined by the material used in the active anode. According to one example, an active anode made from titanium will have a breakdown potential of 8 Volts. If the output voltage is allowed to exceed the breakdown potential of the active anode 315, then this will cause damage to the anode. This is undesirable due to the cost of replacing this type of inert anodes.

If the detected output voltage for the active anode 315 approaches or reaches the maximum value and if a determined polarization potential for the cathode 317 is insufficient for achieving corrosion protection, then the control unit 313 can initially connect the cathode 317 to the passive anode 326. This achieved by controlling the fourth switch 334 into a first closed position (central contactor in FIG. 3A) to connect the passive anode 326 directly to the cathode 317. The cathode 317 is then protected both by the active anode 315 and the impressed current from the first battery 310 in the primary circuit and by the current from the passive anode 326 in the secondary circuit.

If a subsequently determined polarization potential for the cathode 317 is still insufficient, then the control unit 313 is operable to connect the sacrificial anode 326 to the second battery 320 in order to boost the polarization potential for the cathode 317. This achieved by controlling the fifth switch 336 into a second position as shown in FIG. 3B. This causes the passive anode 326 to be connected to the cathode 317 via the second battery 320. The cathode 317 is then protected both by the active anode 315 and the impressed current from the first battery 310 in the primary circuit and by the current from the now active anode 326 and the impressed current from the second battery 320 in the parallel secondary circuit.

The control unit 313 is operable to control the output voltage supplied to the primary and secondary circuits separately; in order to supply an individual output voltage to each circuit. As opposed to the output voltage for the primary circuit, the output voltage supplied to the secondary circuit is theoretically only limited by the voltage of the second battery 320. State-of-the-art anodes are mounted using steel fixtures which will also ensure good electrical contact with the anode. In the case of the invention, sacrificial anodes will be subjected to an impressed current, requiring the fixtures to be made of titanium or a similar suitable metal to avoid corrosion of the fixtures. Hence, in practice, the output voltage in the secondary circuit will be restricted to the breakdown potential of the fixtures for the sacrificial anode. Consequently, if the fixtures comprise titanium then the breakdown potential will be 8 Volts. The control unit 313 can be operable to supply both the primary and secondary circuits from a single power source or to supply the respective circuits from different power sources having the same or different output power. For instance, the primary circuit can be supplied from a 12-, 24- or 48-Volt battery or generator, while the secondary circuit can be supplied from a high voltage energy storage unit that can provide several hundred Volts. The output voltage in the primary and secondary circuits can be controlled individually to provide a polarization potential for the cathode 317 that provides at least an acceptable level of protection.

The corrosion protection system shown in FIGS. 3A and 3B can also be operated in a salinity measurement mode. In this mode the switches in the electrical circuit are controlled by the control unit 313 so that the active anode 315 temporarily forms a cathode (C) and the normally disconnected passive anode 326 temporarily forms an active anode (A). While the corrosion protection system is in a salinity measurement mode, the cathode 317 which is normally protected by the corrosion protection system is temporarily disconnected from the circuit. The control unit 313 is arranged to interrupt the corrosion protection mode and switch to the salinity measurement mode at regular intervals to monitor the salinity of the water in which the vessel is operated. Any suitable time interval can be selected for this purpose, although an interval of 5-10 minutes is sufficient for the intended purpose.

In operation, when switching to the salinity measurement mode, the control unit 313 will actuate the controllable switches as follows. Initially, the first switch 331, arranged between the positive terminal of the first battery 310 and the anode 315, is opened to disconnect the active anode 315 from the battery. Subsequently, the second switch 332, arranged between the negative terminal of the first battery 310 and the cathode 317, is switched to disconnect the cathode 317 from the first battery 310. The third switch 333, arranged between the negative terminal of the first battery 310 and the active anode 315, is then closed (not shown in FIG. 3B) to connect the active anode 315 to the negative terminal of the first battery 310. The active anode 315 now forms a cathode for the duration of the measurement mode. Finally, the fourth switch 334, arranged to connect or disconnect the passive anode 326 to or from the corrosion protection system, is switched to a second position (upper contactor in FIG. 3A) wherein the passive anode 326 is connected to the positive terminal of the first battery 310. The passive anode 326 now forms an active anode for the duration of the measurement mode.

The above-mentioned arrangement is described in the application PCT/EP2019/076790. However, the salinity measurement mode as such is not part of the current invention and will not be described in further detail here.

Figure 4:
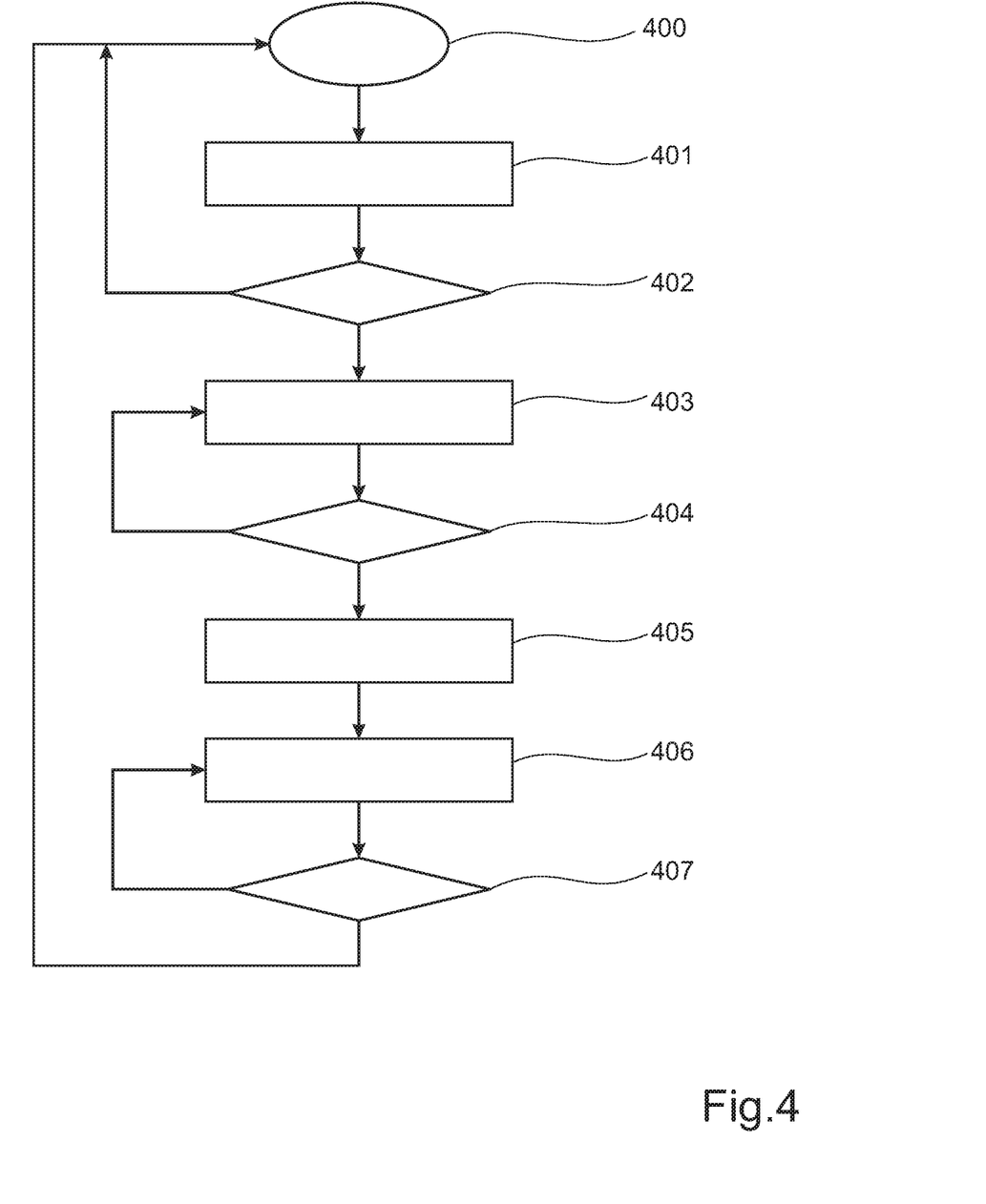
FIG. 4 shows a schematic diagram illustrating a method of operating an impressed cathodic corrosion protection system according to the invention.

FIG. 4 shows a schematic diagram illustrating a method of operating an impressed cathodic corrosion protection system according to the invention. In operation, the ICCP system is being operated for protecting a marine vessel with a marine propulsion system against corrosion of submerged metallic components. The ICCP system can be operated using an on-board source of DC power, as described in connection with FIGS. 1 and 2, or using DC power supplied from a shore facility, in order to conserve the on-board power source.

With reference to FIGS. 3A and 3B described above, the method for operating the system according to the invention comprises the following method steps. The method comprises an initial step 400 wherein the control unit is arranged to control the primary circuit during normal operation of the ICCP system as described in the text above.

In a first step 401, the control unit 313 is arranged to interrupt the impressed cathodic protection operation and to initiate a measurement sequence to determine a polarized potential for the cathode 317. Interruption of the ICCP can involve briefly disconnecting each second electrode normally acting as a cathode during ICCP operation from the negative terminal of the power source prior to and during the measurement sequence. The measurement sequence can be initiated at predetermined intervals, such as every 5 or 10 minutes. This step can also comprise a measurement of electrolyte resistivity in order to determine the salinity of the surrounding body of water.

In a second step 402, the method involves operating the control unit 313 to compare the determined polarized potential for the cathode 317 with a desired value for polarized potential in the primary circuit. If the determined polarized potential is equal to the desired value, or at least within an allowable range then the method returns to the previous, initial step 400 for normal operation of the system. If required, the control unit will attempt to correct the potential prior to a subsequent measurement by controlling the output voltage of the first battery 310. If the determined polarized potential is approaching a maximum value, or if the maximum value has been exceeded, then the method proceeds to the next step.

In a third step 403, the method involves connecting the passive electrode 326 in the secondary circuit to the cathode 317 in order to assist the active anode 315 in providing corrosion protection for the cathode 317.

In a fourth step 404, the method involves operating the control unit 313 to determine and compare the polarized potential for the cathode 317 with a desired value for polarized potential in the primary circuit. If the determined polarized potential is equal to the desired value, or at least within an allowable range then the method returns to the previous, third step 403 for continued operation of the system. If required, the control unit will control the output voltage in the primary circuit attempt to correct the potential towards the desired value prior to a subsequent measurement. If the output voltage in the primary circuit is approaching a maximum value, or if the maximum value for output voltage has been exceeded, then the method proceeds to the next step.

In a fifth step 405, the method involves connecting the passive electrode 326 to the positive terminal of the second battery 320 to act as an active anode.

In a sixth step 406, the method involves operating the control unit 313 for individual control of the output voltage in the primary circuit and the secondary circuit to attempt to correct the potential towards the desired value. In this step, the output voltage in the primary circuit can be controlled up to the maximum value, while the output voltage in the secondary circuit can be controlled in excess of the maximum value for output voltage.

In a final step 407, the method involves operating the control unit 313 to determine and compare the polarized potential for the cathode 317 with a desired value for polarized potential in the primary circuit. If the determined polarized potential is insufficient and if the output voltage in the primary circuit is still near the maximum value then the method returns to the previous, sixth step 406 for continued operation of the system. If the determined polarized potential has returned towards its desired value, then the method returns to the initial step 400. Normal operation of the impressed cathodic corrosion protection can then be resumed.

It is to be understood that the present invention is not limited to the embodiments described above and illustrated in the drawings; rather, the skilled person will recognize that many changes and modifications may be made within the scope of the appended claims.

The invention claimed is:

1. A marine impressed current cathodic protection system having an electrical circuit comprising a control unit for controlling the impressed current cathodic protection system, voltage sensors detecting an output voltage impressed on the circuit and measuring polarized potential of the protected structure, current sensor detecting a current supplied to the circuit and a source of electrical power from at least one direct current power source; wherein the electrical circuit comprises a primary circuit and a secondary circuit;

the primary circuit comprising:
at least one first electrode connected to a positive terminal of the at least one power source to act as an active anode; and
at least one second electrode connected to a negative terminal of the at least one power source to act as a cathode, wherein at least one metallic component to be protected forms said cathode;

and the secondary circuit comprising:
at least one passive electrode normally disconnected from the electrical circuit and arranged to act as back-up protection, the at least one passive electrode being a sacrificial anode;
the at least one second electrode connectable to the at least one passive electrode;

wherein
the at least one passive electrode is connectable to the positive terminal of the at least one power source by a controllable switch in the secondary circuit;
the control unit is operable to control the marine impressed current cathodic protection system such that the at least one passive electrode is connected to the at least one power source if a detected output voltage in the primary circuit reaches a maximum value and if a determined polarization potential for the cathode is insufficient;

wherein
the control unit is operable to control the output voltage supplied to the primary and secondary circuits separately; in order to supply an individual output voltage to each circuit.

2. The system according to claim 1, wherein the control unit is operable to monitor the output voltage and current supplied to the at least one first electrode, and to determine a value for polarization potential for the cathode in the primary circuit.

3. The system according to claim 2, wherein the control unit is operable to compare the polarization potential of the cathode to a desired protection potential and to control the output voltage and current to minimize the potential difference.

4. The system according to claim 1, wherein the maximum value for the output voltage in the primary circuit corresponds to the breakdown potential of the first electrode.

5. The system according to claim 1, wherein the output voltage supplied to the primary circuit is limited by the maximum value for the output voltage in the primary circuit.

6. The system according to claim 1, wherein the output voltage supplied to the secondary circuit is limited by the voltage of the at least one direct current power source.

7. A method for controlling a marine impressed current cathodic protection system having an electrical circuit comprising a control unit for controlling the impressed current cathodic protection system, voltage sensors detecting an output voltage impressed on the circuit and measuring polarized potential of the protected structure, current sensor detecting a current supplied to the circuit and at least one source of electrical power from at least one direct current power source; where the electrical circuit further comprises a primary circuit comprising:
at least one first electrode connected to a positive terminal of the power source to act as an active anode;
at least one second electrode connected to a negative terminal of the power source to act as a cathode, wherein at least one metallic component to be protected forms said cathode; and a secondary circuit comprising:
at least one passive electrode normally disconnected from the electrical circuit and arranged to act as back-up protection, the at least one passive electrode being a sacrificial anode;
the at least one second electrode connectable to the at least one passive electrode;
wherein the method comprises the steps of:
monitoring the output voltage and current supplied to the at least one first electrode, and determining a value for polarization potential for the primary circuit;
comparing the polarization potential to a desired protection potential and controlling the output voltage and current to minimize the potential difference;
and if the monitored output voltage reaches a maximum value;
connecting the at least one passive electrode to the electrical circuit;
connecting the at least one passive electrode to a source of electrical power; and
controlling the output voltage supplied to the primary and secondary circuits separately and supplying an individual output voltage to each circuit.

8. The method according to claim 7, wherein the maximum value for the output voltage in the primary circuit corresponds to the breakdown potential of the first electrode.

9. The method according to claim 7, wherein the output voltage supplied to the primary circuit is limited by the maximum value for the output voltage in the primary circuit.

10. The method according to claim 7, wherein the output voltage supplied to the secondary circuit is limited by the voltage of the at least one direct current power source or breakdown potential of the contacting material.

11. The method according to claim 7, wherein the method involves the option step of determining a value for polarization potential for the primary circuit and comparing the polarization potential to a desired protection potential prior to connecting the at least one passive electrode to a source of electrical power.

12. A vessel provided with a marine impressed current cathodic protection system according to claim 1.

\* \* \* \* \*